Patented July 18, 1933

1,918,558

UNITED STATES PATENT OFFICE

HENDRICUS PLANT, OF WASSENAAR, NETHERLANDS

METHOD FOR THE TREATMENT OF PLANTS, PARTS OF PLANTS, AND RAW FIBERS

No Drawing. Application filed December 6, 1932, Serial No. 645,951, and in the Netherlands November 2, 1932.

The invention relates to a method for treating plants, parts of plants and raw fibers.

Up until now the usual method for recovering fibers from plants, such as flax, ramee and the like, consisted in that same were first retted for several days, and then submitted to a lengthened mechanical treatment. Moreover, sometimes a lengthened treatment by hand was required (fine fibers must be hackled). Finally a bleaching by various bleaching means took place.

At present plants like sisal are stripped by machine of their epidermis, and as much as possible of all vegetable matter, so that there remain only bundles of fibers, the inside and outside of which contain rests of vegetable matter. After drying, these bundles of fibers are hard and stiff, and can only be used for very few purposes.

If starting from parts of plants, like pine-apple-leaves, same cannot be treated by machine without enormous losses of fibrous material.

The present invention has for its object to omit the retting, the treatment by machine and by hand, and the subsequent bleaching of plants like flax.

A further object is to improve the small suppleness of the mechanically treated fibers, like sisal fibers, in fresh condition, and to thereby render same suitable for more purposes.

According to the invention it is also possible to defiber parts of plants, such as pine-apple leaves, without previous mechanical treatment.

Now the invention consists in that plants, parts of plants and raw fibers, are first boiled, preferably without any air being admitted, in an aqueous solution of alkaline hydroxides, preferably potassium hydroxide, and that then the material is successively treated in a hot or cold aqueous solution of sulphuric acid, an aqueous solution of alkaline hydroxides, preferably sodium hydroxide, and an aqueous solution of an acid, preferably hydrochloric acid, the material being washed by water after treatment in each solution.

The invention is further explained by the following example:

Dried flax stalks are introduced into a tank and boiled for about 75 minutes in an aqueous solution of potassium hydroxide, of a concentration of 9–10%, without any air being admitted, under ordinary pressure. If starting from fresh sisal fibers (which have first been mechanically treated), or from fresh pine-apple leaves, the concentration of this bath should be increased by 50%.

During this boiling the vegetable albumina undergo such a change, that contrary to the ordinary vegetable albumina, they diffuse through the bast. Moreover the diffusing of the albumina and of the pentosanes, hemicellulose, vegetable gum and vegetable mucilage contained in the plants, is rendered much easier, because during the boiling the bast is already partly dissolved, or its structure has been changed in such a manner that diffusing can easily be effected. The pectose which the plants contain has been changed by the boiling, first into para- or meta-pectine, then into para- or meta-pectic acid, and partly into para- or meta-pectate of potassium, which are partly soluble, and partly still consist of insoluble gelatine. The fibers themselves (cellulose) have not in the least suffered during the boiling, as first the impurities are attacked and before the cellulose may be slightly attacked, the boiling period is finished. Now the liquid is eliminated and the mass is washed by hot water, till all rests of chemicals have been eliminated.

For the conversion of the remaining pectic acid or the pectates and the silicic-acid-compounds the mass is treated in a hot or cold aqueous solution of sulphuric acid of a concentration of about 1%, during a period of about ¾ hour, whereby amongst others the silicate of lime, the pectate of lime and the oxalate of lime are transformed into sulphate of lime, which is also less soluble, and into the respective free acids, whilst the para- or meta-pectic materials are converted into pectic acid.

This liquid is also eliminated and the mass is washed by hot water in order to eliminate the chemicals.

In order to render the pectic acid soluble, the mass is treated for at least ¼ hour in an aqueous solution with a concentration of 3–12%, of sodium hydroxide according to the desired fineness of the fibers, whereby the pectic acid is converted into a soluble pectate.

Now the liquid is again eliminated and the mass is washed by hot water in order to eliminate the remaining chemicals.

Finally the mass is treated for about 5–6 minutes in a solution with a concentration of ⅛%, of hydrochloric acid, wherein the sulphate of lime, otherwise difficult to dissolve, is sufficiently soluble to be eliminated. Then the mass is washed by water. The fibers so obtained are perfectly pure and white, and need not be subjected to a bleaching process. As they do no longer contain any substances that might cause decoloration, these fibers can be kept for an indefinite time, without their appearance undergoing any change.

Further the process according to the invention presents the advantage that practically nothing of the chemicals applied is lost, since the washing waters may after concentration be added again to the respective baths, in order to give same the desired concentration.

As a matter of course the method is not limited to the treatment of the materials indicated in the examples. Among the many plant families that may be applied for the method according to the invention, the following may amongst others be mentioned: Amaryllidaceæ, Cyclanthaceæ, Leguminosæ, Moraceæ, Malvaceæ, Linaceæ, Urticaceæ, Bromeliaceæ, Liliaceæ, Gramineæ, Palmæ, Asclepiadaceæ, Tiliaceæ, Musaceæ, Thyphaceæ, Apocynaceæ, Umbelliferæ, Juncaceæ, Salicaceæ, Euphorbiaceæ, Rubiaceæ, Anonaceæ, Sterculiaceæ, cortical fiber in general, Pandanaceæ.

What I claim is:

1. A method of treating plants, parts of plants and raw fibers, characterized in that the said material is first boiled in an aqueous solution of alkaline hydroxides, and that then the material is successively treated in a hot or cold aqueous solution of sulphuric acid, an aqueous solution of alkaline hydroxides and an aqueous solution of an acid, the material being washed by hot water after treatment in each solution.

2. A method for treating plants, parts of plants and raw fibers, characterized in that the said material is first boiled in an aqueous solution of potassium hydroxide and that then the material is successively treated in a hot or cold aqueous solution of sulphuric acid, an aqueous solution of sodium hydroxide and an aqueous solution of hydrochloric acid, the material being washed by water after treatment in each solution.

3. A method for treating plants, parts of plants and raw fibers, characterized in that the said material is first boiled, without any air being admitted, in an aqueous solution of potassium hydroxide and that then the material is successively treated in a hot or cold aqueous solution of sulphuric acid, an aqueous solution of sodium hydroxide and an aqueous solution of hydrochloric acid, the material being washed by water after treatment in each solution.

4. A method for treating plants, parts of plants and raw fibers, characterized in that the said material is first boiled in an aqueous solution with a concentration of 9–10% of potassium hydroxide, and that then the material is successively treated in a hot or cold aqueous solution of sulphuric acid, an aqueous solution of sodium hydroxide and an aqueous solution of hydrochloric acid, the material being washed by water after treatment in each solution.

5. A method for treating plants, parts of plants and raw fibers, characterized in that the said material is first boiled in an aqueous solution with a concentration of 9–10% of potassium hydroxide and that then the material is successively treated in a hot or cold aqueous solution with a concentration about 1% of sulphuric acid, an aqueous solution of sodium hydroxide and an aqueous solution of hydrochloric acid, the material being washed by water after treatment in each solution.

6. A method for treating plants, parts of plants and raw fibers, characterized in that the said material is first boiled in an aqueous solution with a concentration of 9–10% of potassium hydroxide and that then the material is successively treated in a hot or cold aqueous solution with a concentration of about 1% of sulphuric acid, an aqueous solution with a concentration of about 3–12% of sodium hydroxide and an aqueous solution of hydrochloric acid, the material being washed by water after treatment in each solution.

7. A method for treating plants, parts of plants and raw fibers, characterized in that the said material is first boiled in an aqueous solution with a concentration of 9–10% of potassium hydroxide and that then the material is successively treated in a hot or cold aqueous solution with a concentration of about 1% of sulphuric acid, an aqueous solution with a concentration of about 3–12% of sodium hydroxide and an aqueous solution with a concentration of about ⅛% of hydrochloric acid, the material being washed by water after treatment in each solution.

8. A method for treating plants, parts of plants and raw fibers, especially fresh sisal fibers (which have first been mechanically treated) or fresh pine-apple-leaves, characterized in that the said material is first boiled in an aqueous solution of potassium hydroxide, the concentration of which depends upon the water-contents of the starting material and that the material is successively treated in a hot or cold aqueous solution with a concentration of about 1% of sulphuric acid, an aqueous solution with a concentration of about 3–12% of sodium hydroxide and an aqueous solution with a concentration of about ⅛% of hydrochloric acid, the material being washed after treatment in each solution.

HENDRICUS PLANT.